Feb. 20, 1962 R. N. YOUGER 3,022,483
ELECTRICAL TEST PROBE
Filed Nov. 15, 1957

ROBERT N. YOUGER
INVENTOR.

BY *Warren Kent*
ATTORNEY

United States Patent Office 3,022,483
Patented Feb. 20, 1962

3,022,483
ELECTRICAL TEST PROBE
Robert N. Youger, 1536 Woodburn Ave., Covington, Ky.
Filed Nov. 15, 1957, Ser. No. 696,820
1 Claim. (Cl. 339—108)

The present invention relates to electrical test instruments and more particularly to a test probe for checking electrical circuits.

It is commonplace today to use various types of test probes in electronics work. Checking circuits often involves short-circuiting portions of the circuit under test and in certain instances, requires a determination of the particular voltage variation or wave form at a specific point in the circuit. Test probes of the type disclosed herein have been found particularly convenient for such use.

The present invention provides an easily manipulated probe which may be momentarily touched to a predetermined point of the circuit wiring or which may be temporarily secured to the test point if desired. Further, the invention provides a test probe which may be conveniently used to establish connection with an electrical jack.

Briefly, the preferred embodiment of the present invention comprises a test probe having an elongated shank which is force-fitted within a flexible insulating body. Extending from the shank through the end of the body is an electrically conductive shaft which may be used to establish contact with a point in an electrical circuit. A protective sleeve may be slidably positioned on the shaft to prevent undesirable short-circuiting of portions of the circuit not under test. Alternate means are provided for fitting the body to the shank.

It is also within the purview of this invention to provide simplified test probes embodying one or more of the principles of the preferred embodiment.

In view of the foregoing it will be understood that it is broadly an object of the present invention to provide an improved test probe. More specifically, it is an object to provide an improved means for fitting the shank of the test probe within a protective body.

Another object is the provision of wire receiving means in the shaft of a test probe which can be exposed for use by sliding a protective sleeve along the shaft beyond the wire receiving means.

A further object is the provision of a test probe having a shaft which can be snugly inserted in the female portion of an electrical jack.

More specific objects are:

(a) Provision of an elongated slot in the shank of a test probe which may be selectively distorted to establish a force-fit between the shank and a protective body.

(b) Provision of a plurality of circumferentially spaced longitudinal slots of different radial dimension within a body to receive a shank inserted within the body.

(c) Provision of a test probe having an elongated shaft with which a protective sleeve is slidably disposed.

(d) Provision of a hollow body having an irregular interior within which the shank of a test probe may be selectively fitted.

(e) Provision of various effective and simple means for interconnecting an internal spring of a test probe with a slidable protective sleeve.

The novel features that are considered characteristic of the invention are set forth in the appended claim; the invention itself, however, both as to its organization and use, together with additional objects and advantages thereof, will best be understood from the following description of a specific embodiment when read in conjunction with the accompanying drawings, in which:

Figure 1:
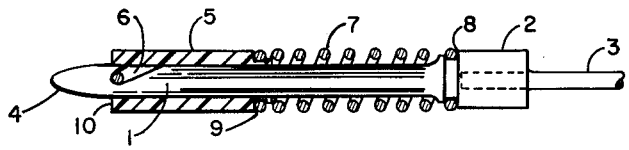
FIGURE 1 is a longitudinal sectional view through a simplified test probe.

The elementary form of test probe shown in FIGURE 1 comprises an elongated shaft 1 having at its one end an enlargement 2 with which lead wire 3 is connected, and at its other end, tip 4 which may be used to establish contact with a circuit under test. An insulating sleeve of plastic 5 is slidably disposed on shaft 1 and normally covers a wire receiving notch 6 formed in one side of the shaft near the tip. The sleeve is retained in normal covering position by a compression coil spring 7. The spring may be effectively engaged with the enlargement 2 and the sleeve 5 through engagement of its end coils with grooves 8 and 9 respectively.

The length of the spring is normally chosen so that the sleeve covers the wire receiving notch 6. In use the end 10 of the sleeve may be forced against a wire in a test circuit to compress the spring 7 and expose the notch 6. In this way, the test wire may be forced into the notch and trapped therein by the sleeve under the influence of spring 7.

Since positioning of the sleeve relative to the notch is important, it is necessary that some positive means be used to engage the spring with both the enlargement 2 and the sleeve. Constructions other than grooves 8 and 9 may be used. For instance, in FIGURE 2, the sleeve 5 has an elongated collar 11 over which the spring 7 is force-fitted. In FIGURE 3 the collar defines a helical groove 12 having a pitch equal to that of the spring. The spring may be effectively threaded along the helical groove into firm engagement with the sleeve. Obviously, the same attachments may be used at both ends of the spring.

Figure 4:
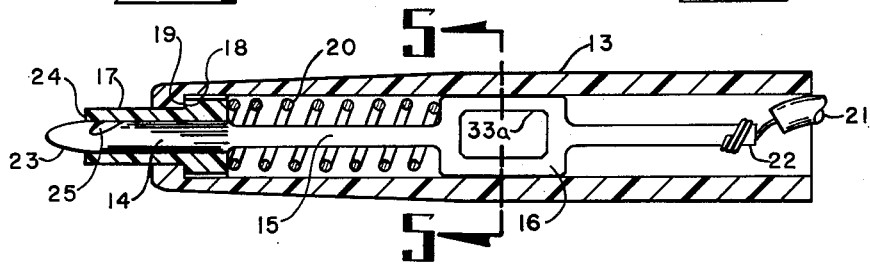
FIGURE 4 is a longitudinal sectional view of the preferred version of the test probe.

Attention should now be directed to FIGURE 4 showing a test probe comprising an insulating cylindrical body 13 and an electrically conducting shaft 14. The shaft is formed integrally with a flattened shank 15 which includes near its center a flattened locking portion 16. As will be explained in more detail shortly, the locking portion 16 is force-fitted within the body 13.

Slidably disposed on shaft 14 is a sleeve 17 including a shoulder 18 which butts against a complementary shoulder 19 of the body limiting outward extension of the sleeve. A coil spring 20 is trapped between locking portion 16 and one end of sleeve 17, and acts to force the sleeve outwardly at all times.

Lead wire 21 may be soldered or otherwise connected, as at 22, to the opposite end of the shank.

The test probe of FIGURE 4 lends itself to a variety of uses. Tip 23 of the shaft may be used to lightly touch any point in a test circuit. If temporary connection is to be made with a wire in the circuit, end 24 of the sleeve may be forced against the wire until it slides into notch 25 of the shaft. This is easily accomplished by manipulation of the probe by one hand of the user. When connection is made with the test circuit, the probe is released and spring 20 forces sleeve 17 into locking engagement with the wire which is trapped in notch 25. It will be noted that the notch has a re-entrant shape which tends to cam the wire towards the center of shaft 14 guaranteeing a tight connection.

The appearance of a wire trapped in this manner is illustrated in FIGURE 3, the wire being shown at W.

Figure 7:
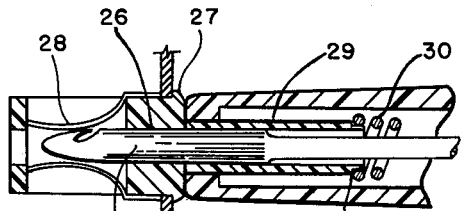
FIGURE 7 shows the test probe in use with an electrical jack.

In addition to the above mentioned uses, the test probe may also be used to make connection with a jack, such as illustrated in FIGURE 7. Here, shaft 14 is forced through opening 26 of the jack 27 until it makes yieldable engagement with springs 28. The protective sleeve 29 is automatically forced into the body of the test probe, compressing its associated spring 30.

Figure 2:
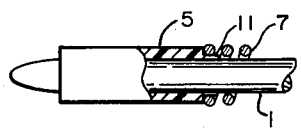
FIGURE 2 shows an alternate way of attaching a spring to a slidable sleeve in a test probe.
Figure 3:
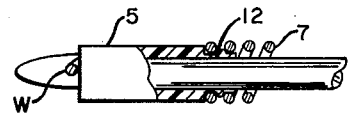
FIGURE 3 shows still another way of attaching the spring to the sleeve.

FIGURE 7 also illustrates a modification of the sleeve along the lines illustrated by FIGURE 2. It will be noted that spring 30 is force-fitted about collar 31 thereby assuring engagement of the spring with the sleeve and controlling the extent to which it can move outwardly from the body of the probe. This eliminates the need for providing shoulder 18 on the sleeve.

Figure 5:
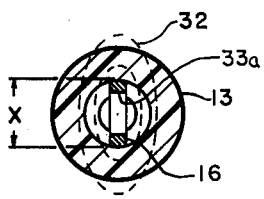
FIGURE 5 is a cross-sectional view through the test probe taken on plane 5—5 of FIGURE 4.

An important feature of the invention is the means for assuring a tight fit of the shank within the body of the probe. First, it should be noted that the body of the probe is made from a flexible, high temperature plastic such as nylon. In its normal state of relaxation the body has a circular cross-section as indicated in FIGURE 5, but by applying pressure to the sides thereof it may be distorted as indicated by dash lines at 32. This distortion enlarges the vertical interior dimension of the sleeve until it passes readily over the locking portion 16 of the shank. When pressure is released from the body it returns to substantially its original shape and tightly engages the locking portion.

Occasionally it is necessary to increase the vertical dimension of the locking portion (see dimension X of FIGURE 5) to assure tight engagement with the body. To facilitate such adjustment a slot 33a is provided in the locking portion. A screwdriver or any other suitable tool may be inserted in the slot to spread the locking portion and guarantee a tight fit with the body of the probe.

Figure 6:
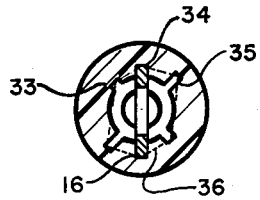
FIGURE 6 is a cross-sectional view comparable to FIGURE 5 showing an alternate construction of the test probe.

To eliminate the need for individually adjusting dimension X of the locking portion, the alternative construction of FIGURE 6 may be used. Here, three longitudinal slots 33, 34, and 35 are molded within the body. The locking portion 16 may be selectively engaged with any one of these slots, each of which has a width slightly different from that of the other slots. As will be apparent from an inspection of the figure, the slots increase progressively in width from the narrowest slot 33 to the widest slot 35. By suitable proportioning of the slots, it can be assured that the locking portion 16 can be force-fitted within one of them to establish a tight fit with the body of the probe and no individual adjustment of the locking portion is necessary, as described in connection with FIGURE 5.

A variation of the slotted body is also illustrated by FIGURE 6. Attention is called to phantom line 36 indicating the irregular interior of the body. If the body is constructed in this manner, the locking portion can be selectively force-fitted within any diametral dimension without individual adjustment of the locking portion. The irregular interior may be generally hexagonal, or any other suitable shape, with either straight or curved sides.

It is important to note that all of the test probes embodying features of this invention are characterized by simplicity and ease of use. Each probe can readily be used in any of its various manners through manipulation by one hand of the user. This is true whether a portion of the circuit is merely touched, or connection is temporarily established with it, or the probe is used to make connection with a jack. As the probe is being used, no danger of shock or short-circuits is encountered since the body of the probe and the sleeve are both made from insulation, such as plastic, and only the tip of the shaft is exposed. Further, when temporary connection has been made to a circuit, the sleeve is extended by its associated spring to cover a major portion of the shaft, so that adjacent portions of the circuit wiring cannot accidently come in contact with it. This is true even of the simplified versions of the probe shown in FIGURES 1-3.

It will be recognized by those skilled in the art that the various features of the invention may be combined in different types of probes, or used individually, without departing from the spirit and teaching of this invention.

Having described a preferred embodiment of my invention, I claim:

A test probe for temporary connection to a test wire comprising an elongated flexible hollow tubular body, an inwardly directed shoulder at one end of said body, a sleeve slidably received in said one end, a first end of said sleeve having an outwardly extending shoulder within said body and in abutting relationship with said inwardly directed shoulder and a second end projecting from said body, an elongated electrically conducting member comprising a first section received in said sleeve, a shank section integral with said first section and extending substantially throughout the length of said body, a flattened locking portion integral with said shank and spaced from said first section, and having a lateral dimension greater than said shank and slightly greater than the interior of said body so that said portion is press-fittedly received therein, said locking portion being slotted for lateral dimensional adjustment, and an extension end terminating near the other end of said body adapted to receive a test lead, a coil spring surrounding said shank and bearing against said outwardly extending shoulder of said sleeve, and said locking portion, said first section having a wire receiving means at its outer end whereby a test wire engageable in said means is forced against said one end of said body by the action of said spring.

References Cited in the file of this patent

UNITED STATES PATENTS

| | | |
|---|---|---|
| 1,255,824 | Shoenberg | Feb. 5, 1918 |
| 1,275,693 | Hubbell | Aug. 13, 1918 |
| 1,584,167 | Camfield | May 11, 1926 |
| 1,847,100 | Rock | Mar. 1, 1932 |
| 2,224,902 | Currie et al. | Dec. 17, 1940 |
| 2,329,471 | King | Sept. 14, 1943 |
| 2,438,350 | Reichard | Mar. 23, 1948 |
| 2,457,506 | Sorensen | Dec. 28, 1948 |
| 2,473,570 | Chirelstein | June 21, 1949 |
| 2,554,876 | Olson | May 29, 1951 |
| 2,640,903 | Kohring | June 2, 1953 |
| 2,654,075 | Gaborc | Sept. 29, 1953 |
| 2,675,528 | La Point | Apr. 13, 1954 |
| 2,677,117 | Swain | Apr. 27, 1954 |
| 2,685,074 | Lazzery | July 27, 1954 |
| 2,702,892 | Youger | Feb. 22, 1955 |
| 2,714,196 | Melehan | July 26, 1955 |
| 2,783,445 | Cahn | Feb. 26, 1957 |
| 2,796,593 | Offerman | June 18, 1957 |
| 2,885,648 | King | May 5, 1959 |

FOREIGN PATENTS

| | | |
|---|---|---|
| 721,962 | Germany | June 24, 1942 |